United States Patent
Sato et al.

(10) Patent No.: US 12,036,510 B2
(45) Date of Patent: Jul. 16, 2024

(54) EXHAUST GAS PURIFICATION DEVICE

(71) Applicants: Akemi Sato, Toyota (JP); Takeshi Hirabayashi, Toyota (JP); Koji Sugiura, Toyota (JP); Keisuke Murawaki, Kakegawa (JP); Takaya Ota, Kakegawa (JP); Masatoshi Ikebe, Kakegawa (JP); Kohei Takasaki, Kakegawa (JP); Takeshi Morishima, Kakegawa (JP)

(72) Inventors: Akemi Sato, Toyota (JP); Takeshi Hirabayashi, Toyota (JP); Koji Sugiura, Toyota (JP); Keisuke Murawaki, Kakegawa (JP); Takaya Ota, Kakegawa (JP); Masatoshi Ikebe, Kakegawa (JP); Kohei Takasaki, Kakegawa (JP); Takeshi Morishima, Kakegawa (JP)

(73) Assignees: TOYOTA JIDOSHA KABUSHIKI KAISHA, Toyota (JP); CATALER CORPORATION, Kakegawa (JP)

(*) Notice: Subject to any disclaimer, the term of this patent is extended or adjusted under 35 U.S.C. 154(b) by 0 days.

(21) Appl. No.: 17/717,690

(22) Filed: Apr. 11, 2022

(65) Prior Publication Data
US 2022/0347626 A1    Nov. 3, 2022

(30) Foreign Application Priority Data
Apr. 30, 2021    (JP) .................................. 2021-077284

(51) Int. Cl.
*B01D 53/94*    (2006.01)

(52) U.S. Cl.
CPC ...... *B01D 53/94* (2013.01); *B01D 2255/1021* (2013.01); *B01D 2255/1025* (2013.01);
(Continued)

(58) Field of Classification Search
CPC .... B01D 2255/1021; B01D 2255/1025; B01D 2255/2042; B01D 2255/2065;
(Continued)

(56) References Cited

U.S. PATENT DOCUMENTS

| | | | |
|---|---|---|---|
| 2009/0193796 A1 | 8/2009 | Wei et al. | |
| 2012/0124974 A1* | 5/2012 | Li | B01J 19/2485 502/65 |

(Continued)

FOREIGN PATENT DOCUMENTS

| | | |
|---|---|---|
| CN | 103781532 A | 5/2014 |
| EP | 3 590 598 A1 | 1/2020 |

(Continued)

*Primary Examiner* — Phutthiwat Wongwian
*Assistant Examiner* — Diem T Tran
(74) *Attorney, Agent, or Firm* — Oliff PLC (57) ABSTRACT

An exhaust gas purification device suppresses a pressure loss increase and includes a honeycomb substrate and inflow cell side catalyst layer. The substrate includes a porous partition wall defining several cells extending from an inflow side end surface to an outflow side end surface. The cells include an inflow and outflow cell adjacent across the wall. The inflow cell has an open inflow side end and sealed outflow side end. The outflow cell has a sealed inflow side end and open outflow side end. The catalyst layer is on an inflow cell side surface in an region extending from the inflow side end positioned 10% or more of the partition wall length. At this position, a filled portion of the inflow cell side catalyst layer pores are 40% or less. The pores are present to a depth of 50% of a thickness of the partition wall.

2 Claims, 6 Drawing Sheets

(52) U.S. Cl.
CPC ............... *B01D 2255/2042* (2013.01); *B01D 2255/2065* (2013.01); *B01D 2255/20715* (2013.01); *B01D 2255/407* (2013.01); *B01D 2255/9155* (2013.01); *F01N 2330/60* (2013.01); *F01N 2510/0682* (2013.01)

(58) Field of Classification Search
CPC .... B01D 2255/20715; B01D 2255/407; B01D 2255/9155; B01D 2258/01; B01D 53/94; B01D 53/945; F01N 2330/06; F01N 2330/60; F01N 2510/0682; F01N 3/021; F01N 3/0222; F01N 3/035
See application file for complete search history.

(56) References Cited

U.S. PATENT DOCUMENTS

| | | | |
|---|---|---|---|
| 2012/0186229 A1* | 7/2012 | Phillips | ............... B01J 37/0244 60/274 |
| 2014/0227155 A1 | 8/2014 | Phillips et al. | |
| 2020/0368735 A1 | 11/2020 | Sugiura et al. | |
| 2021/0001315 A1 | 1/2021 | Kurihara et al. | |

FOREIGN PATENT DOCUMENTS

| | | | |
|---|---|---|---|
| JP | 2000-282852 A | | 10/2000 |
| JP | 2012236180 | * | 12/2012 |
| JP | 5689685 B2 | | 3/2015 |
| JP | 2020-193569 A | | 12/2020 |
| WO | WO 2018159214 | * | 9/2018 |
| WO | WO2019/188620 A1 | | 9/2020 |

* cited by examiner

Cross-Sectional Surface Perpendicular to Extending Direction at Partition Wall Reference Position

Comparative Example 1 (Proportion of Filled Portion: 47%)

Fig. 4B

Comparative Example 2 (Proportion of Filled Portion: 52%)

EXHAUST GAS PURIFICATION DEVICE

CROSS REFERENCE TO RELATED APPLICATIONS

The present application claims priority from Japanese patent application JP 2021-077284 filed on Apr. 30, 2021, the entire content of which is hereby incorporated by reference into this application.

BACKGROUND

Description of Related Art

The present disclosure relates to an exhaust gas purification device that includes a catalyst in a filter having a wall flow structure.

Background Art

An exhaust gas discharged from an internal combustion engine in, for example, an automobile contains a Particulate Matter (PM, hereinafter abbreviated as "PM" in some cases) mainly containing carbon, which causes air pollution, an ash as a non-combustible component, and the like. As a filter to trap and remove the PM from the exhaust gas, a filter having a wall flow structure has been widely used.

The filter having the wall flow structure usually includes a honeycomb substrate. The honeycomb substrate includes a porous partition wall defining a plurality of cells extending from an inflow side end surface to an outflow side end surface, and the plurality of cells include inflow cells and outflow cells adjacent across the partition wall. The inflow cell has an open inflow side end and a sealed outflow side end, and the outflow cell has a sealed inflow side end and an open outflow side end. In view of this, the exhaust gas flowed into the inflow cell from the inflow side end passes through the partition wall to flow into the outflow cell, thus being discharged from the outflow side end of the outflow cell. When the exhaust gas passes through the partition wall, the PM is accumulated in pores present in the partition wall. As examples of the filter having the wall flow structure, a diesel particulate filter (DPF) for diesel engine and a gasoline particulate filter (GPF, hereinafter abbreviated as "GPF" in some cases) for gasoline engine have been known.

Meanwhile, in addition to the PM, the exhaust gas contains harmful components, such as carbon monoxide (CO), hydrocarbons (HC), and nitrogen oxides (NOx). The harmful components can be removed from the exhaust gas by a filter over which a catalyst, such as a noble metal catalyst, is applied.

Recently, to remove both of the PM and the harmful components from the exhaust gas, an exhaust gas purification device including a catalyst in a filter having a wall flow structure has been used. For example, JP 2000-282852 A discloses an exhaust emission purification device in which a NOx reducing catalyst layer is disposed on a surface of a porous partition wall of a honeycomb substrate included in a filter, and an oxidation catalyst layer is further disposed on a surface of the NOx reducing catalyst layer.

JP 2020-193569 A discloses an exhaust gas purification device that includes a honeycomb substrate and an inflow cell side catalyst layer. In the exhaust gas purification device, the inflow cell side catalyst layer is disposed on an inflow cell side surface in an inflow cell side catalyst region from an inflow side end to a predetermined position close to an outflow side end of a partition wall. A gas permeability is higher in an outflow side partition wall portion including an outflow side region from the predetermined position to the outflow side end of the partition wall than in a catalyst-disposed partition wall portion including the inflow cell side catalyst region and the inflow cell side catalyst layer of the partition wall.

Furthermore, WO 2019/188620 discloses an exhaust gas purification catalyst that includes a substrate and a catalyst portion disposed on the substrate. The catalyst portion includes a first catalyst portion disposed on at least a part of a surface facing an inlet-side cell of a partition wall in an upstream side of a flowing direction, and a second catalyst portion disposed on at least a part of a surface facing an outlet-side cell of the partition wall in a downstream side of the flowing direction. When assuming that a value measured for the first catalyst portion and the partition wall as a target in a portion in which the first catalyst portion is disposed is a first pore volume, and a value measured for the second catalyst portion and the partition wall as a target in a portion in which the second catalyst portion is disposed is a second pore volume relative to a pore volume with a pore size of 10 μm or more and 18 μm or less, the first pore volume is larger than the second pore volume.

SUMMARY

In the exhaust emission purification device that includes the catalyst disposed in the filter having the wall flow structure disclosed in JP 2000-282852 A, the catalyst layer disposed on the porous partition wall of the honeycomb substrate included in the filter possibly decreases the gas permeability of the partition wall, thus increasing the pressure loss.

In contrast, in the exhaust gas purification device disclosed in JP 2020-193569 A, by making the gas permeability of the outflow side partition wall portion of the partition wall higher than that of the catalyst-disposed partition wall portion of the partition wall, the pressure loss is attempted to be reduced. In the exhaust gas purification catalyst disclosed in WO 2019/188620, by adjusting the lengths in the exhaust gas flowing direction or the like of the first catalyst portion and the second catalyst portion, the pressure loss is attempted to be reduced.

Meanwhile, in these conventional exhaust gas purification devices including the catalyst disposed in the filter having the wall flow structure, the pressure loss possibly increases as the PM in the exhaust gas is accumulated in the pores present in the partition wall.

The present disclosure has been made in view of these points, and the present disclosure provides an exhaust gas purification device that allows suppressing an increase of a pressure loss due to accumulation of PM.

To solve the above-described problem, an exhaust gas purification device of the present disclosure is an exhaust gas purification device that comprises a honeycomb substrate and an inflow cell side catalyst layer. The honeycomb substrate includes a porous partition wall defining a plurality of cells extending from an inflow side end surface to an outflow side end surface. The plurality of cells include an inflow cell and an outflow cell adjacent across the partition wall. The inflow cell has an open inflow side end and a sealed outflow side end. The outflow cell has a sealed inflow side end and an open outflow side end. The inflow cell side catalyst layer is disposed on an inflow cell side surface in an inflow cell side catalyst region extending from the inflow side end of the partition wall to a position apart by a distance of 10% or more of a length of the partition wall along an extending direction. At a reference position apart from the inflow side end of the partition wall by a distance of 10% of the length of the partition wall along the extending direction, a proportion of a filled portion filled with the inflow cell side catalyst layer in pores is 40% or less. The pores are present in an inner region up to a depth of 50% of a thickness of the partition wall from the inflow cell side surface of the partition wall.

The exhaust gas purification device of the present disclosure can suppress the increase of the pressure loss due to the accumulation of PM.

In the exhaust gas purification device, the inflow cell side catalyst region of the partition wall may be a region extending from the inflow side end of the partition wall to a position apart by a distance of 10% or more and 60% or less of the length of the partition wall along the extending direction.

Effect

The present disclosure can suppress the increase of the pressure loss due to the accumulation of PM.

DETAILED DESCRIPTION OF THE EMBODIMENTS

The following describes embodiments of an exhaust gas purification device according to the present disclosure.

The exhaust gas purification device according to the embodiment is an exhaust gas purification device including a honeycomb substrate and an inflow cell side catalyst layer. The honeycomb substrate includes a porous partition wall defining a plurality of cells extending from an inflow side end surface to an outflow side end surface. The plurality of cells include an inflow cell and an outflow cell adjacent across the partition wall. The inflow cell has an open inflow side end and a sealed outflow side end. The outflow cell has a sealed inflow side end and an open outflow side end. The inflow cell side catalyst layer is disposed on an inflow cell side surface in an inflow cell side catalyst region extending from the inflow side end of the partition wall to a position apart by a distance of 10% or more of a length of the partition wall along an extending direction (a position a distance of 10% or more of a length of the partition wall away from the inflow side end along an extending direction of the partition wall). At a reference position (hereinafter, abbreviated to a "partition wall reference position" in some cases) apart from the inflow side end of the partition wall by a distance of 10% of the length of the partition wall along the extending direction, a proportion of a filled portion filled with the inflow cell side catalyst layer (hereinafter, abbreviated to a "filled portion" in some cases) in pores is 40% or less. The pores are present in an inner region up to a depth of 50% of a thickness of the partition wall from the inflow cell side surface of the partition wall (hereinafter, abbreviated to an "inflow cell side inner region of the partition wall" in some cases). In other words, the partition wall reference position is a position a distance of 10% of the length of the partition wall away from the inflow side end along the extending direction. Further, the inflow cell side inner region of the partition wall is an inner region of the partition wall from the inflow cell side surface of the partition wall to a depth of 50% of a thickness of the partition wall.

In the embodiment, the "inflow side" means a side from which an exhaust gas flows in in the exhaust gas purification device and the "outflow side" means a side from which the exhaust gas flows out in the exhaust gas purification device. The "length of the partition wall" means a length in the extending direction of the partition wall. Furthermore, the honeycomb substrate has an axial direction which is usually approximately the same as the extending direction of the partition wall, and the cell has an extending direction which is usually approximately the same as the extending direction of the partition wall. In the following description of the embodiment, the "extending direction" means a direction which is the extending direction of the partition wall, and is approximately the same as the axial direction of the honeycomb substrate and the extending direction of the cell.

Figure 1:
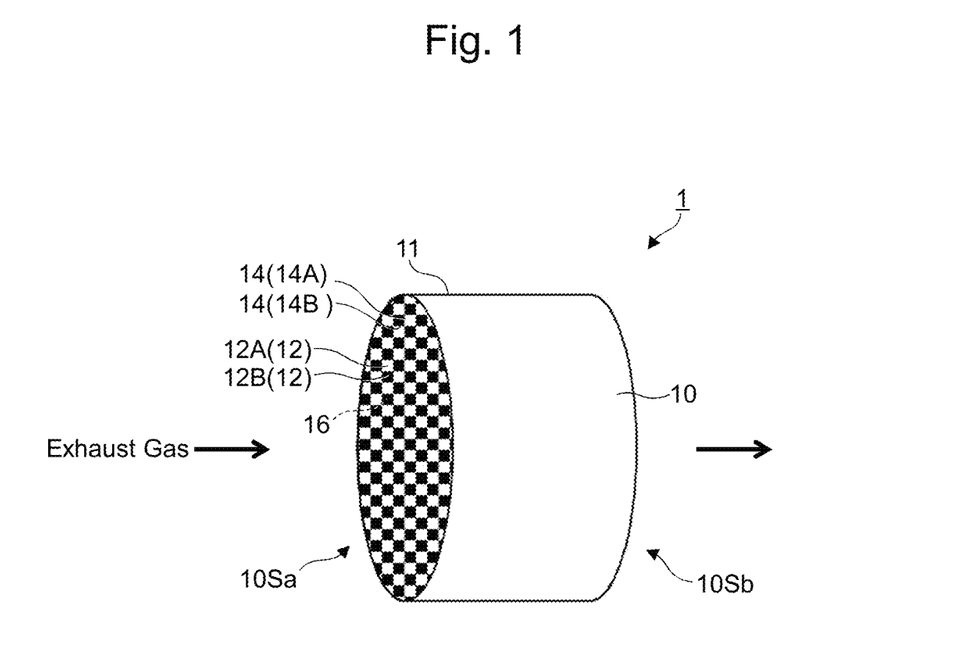
FIG. 1 is a perspective view schematically illustrating an exhaust gas purification device according to a first embodiment.
Figure 2:
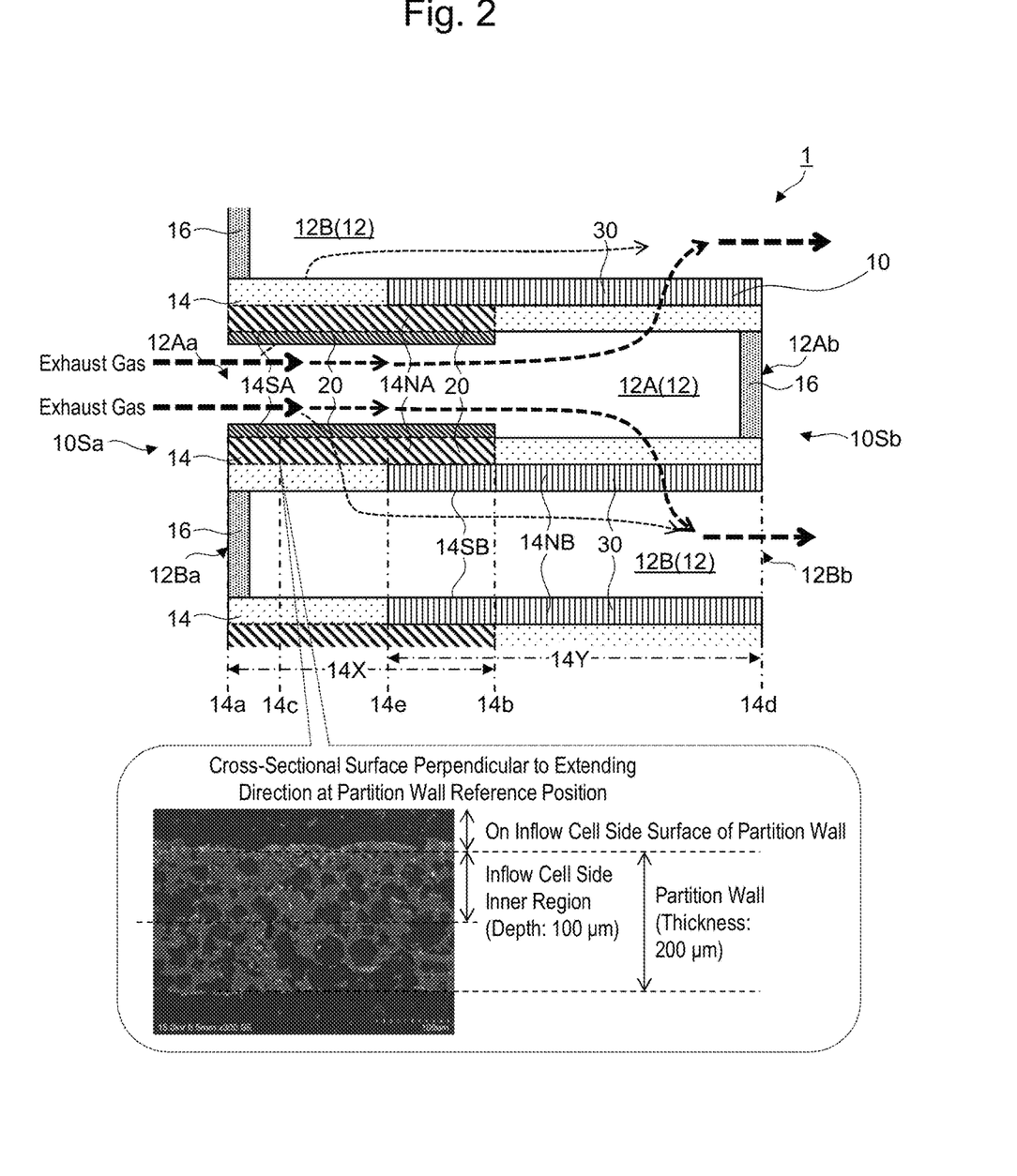
FIG. 2 is a cross-sectional view schematically illustrating a main part of the exhaust gas purification device according to the first embodiment taken along a surface parallel to an extending direction of a cell.

Here, an outline of the exhaust gas purification device according to the embodiment will be described with an exhaust gas purification device according to the first embodiment as an example. FIG. 1 is a perspective view schematically illustrating the exhaust gas purification device according to the first embodiment. FIG. 2 is a cross-sectional view schematically illustrating a main part of the exhaust gas purification device according to the first embodiment taken along a surface parallel to the extending direction of the cell. FIG. 2 illustrates an exemplary image of a cross-sectional surface perpendicular to the extending direction at a reference position apart from an inflow side end of the partition wall by a distance of 10% of the length of the partition wall along the extending direction in a balloon.

As illustrated in FIG. 1 and FIG. 2, an exhaust gas purification device 1 according to the first embodiment includes a honeycomb substrate 10, sealing portions 16, inflow cell side catalyst layers 20, and outflow cell side catalyst layers 30. The honeycomb substrate 10 is a substrate in which a cylindrical-shaped frame portion 11 and a partition wall 14 partitioning a space inside the frame portion 11 into a honeycomb shape are integrally formed. The partition wall 14 is a porous body that defines a plurality of cells 12 extending from an inflow side end surface 10Sa to an outflow side end surface 10Sb of the honeycomb substrate 10. The partition wall 14 includes a plurality of wall portions 14A arranged to be mutually separated and parallel and a plurality of wall portions 14B orthogonal to the plurality of wall portions 14A and arranged to be mutually separated and parallel such that cross-sectional surfaces perpendicular to the extending direction of the plurality of cells 12 have square shapes. A cross-sectional surface of the partition wall 14 perpendicular to the extending direction has a grid shape.

The plurality of cells 12 include inflow cells 12A and outflow cells 12B adjacent across the partition wall 14. The inflow cell 12A has an open inflow side end 12Aa and an outflow side end 12Ab sealed by the sealing portion 16. The outflow cell 12B has an inflow side end 12Ba sealed by the sealing portion 16 and an open outflow side end 12Bb.

The inflow cell side catalyst layer 20 is disposed on an inflow cell side surface 14SA in an inflow cell side catalyst region 14X extending from an inflow side end 14a of the partition wall 14 to a position 14b apart by a distance of 10% or more of a length of the partition wall 14 along the extending direction. Furthermore, the inflow cell side catalyst layer 20 is disposed in pores present in an inner region 14NA up to a depth of 50% of a thickness of the partition wall 14 from the inflow cell side surface 14SA in the inflow cell side catalyst region 14X of the partition wall 14. At a reference position 14c apart from the inflow side end 14a of the partition wall 14 by a distance of 10% of the length of the partition wall 14 along the extending direction, a proportion of a filled portion filled with the inflow cell side catalyst layer 20 in the pores present in the inner region 14NA in the inflow cell side of the partition wall 14 is 40% or less. The inflow cell side catalyst layer 20 includes catalyst metal particles containing at least one (not illustrated) of palladium (Pd) and platinum (Pt), and a carrier (not illustrated) that supports them.

The outflow cell side catalyst layer 30 is disposed in pores present in an inner region 14NB in the outflow cell side in an outflow cell side catalyst region 14Y extending from an outflow side end 14d of the partition wall 14 to a position 14e apart toward the inflow side along the extending direction. The outflow cell side catalyst layer 30 includes catalyst metal particles (not illustrated) containing rhodium (Rh) and a carrier (not illustrated) that supports them.

In a conventionally known exhaust gas purification device, when an inflow cell side catalyst layer is disposed in an inflow cell side catalyst region of a partition wall at a density which is approximately the same as that of the inflow cell side catalyst layer according to the first embodiment, a proportion of a filled portion filled with the inflow cell side catalyst layer in pores present in an inflow cell side inner region of the partition wall exceeds 40% at a partition wall reference position. Therefore, the pores for accumulating the PM is not sufficiently maintained in the inflow cell side inner region of the partition wall. Furthermore, on an inflow cell side surface of the partition wall, the inflow cell side catalyst layer is not disposed with an amount that allows suppressing entering of the PM into the inflow cell side inner region of the partition wall and allows sufficiently accumulating the PM. Therefore, when an exhaust gas passes through the inflow cell side catalyst region of the partition wall, since the PM is not sufficiently accumulated on the inflow cell side catalyst layer on the inflow cell side surface of the partition wall, obstruction in the pores easily progresses in the process of accumulating the PM in the pores present in the inflow cell side inner region of the partition wall. Consequently, as the PM is accumulated in the inflow cell side catalyst region of the partition wall, the pressure loss possibly increases.

In contrast, in the exhaust gas purification device 1 according to the first embodiment, the inflow cell side catalyst layer 20 is disposed on the inflow cell side surface 14SA in the inflow cell side catalyst region 14X of the partition wall 14, and the proportion of the filled portion filled with the inflow cell side catalyst layer 20 in the pores present in the inner region 14NA in the inflow cell side of the partition wall 14 is 40% or less at the reference position 14c of the partition wall 14. Therefore, the pores for accumulating the PM is sufficiently maintained in the inner region 14NA in the inflow cell side of the partition wall 14. Furthermore, on the inflow cell side surface 14SA of the partition wall 14, the inflow cell side catalyst layer 20 is disposed with an amount that allows suppressing entering of the PM into the inner region 14NA in the inflow cell side of the partition wall 14 and allows sufficiently accumulating the PM. Therefore, when an exhaust gas passes through the inflow cell side catalyst region 14X of the partition wall 14, since the PM is sufficiently accumulated by the inflow cell side catalyst layer 20 on the inflow cell side surface 14SA of the partition wall 14, obstruction in the pores is less likely to progress in the process of accumulating the PM in the pores present in the inner region 14NA in the inflow cell side of the partition wall 14. Thus, the increase of the pressure loss due to the accumulation of PM can be suppressed.

Accordingly, according to the exhaust gas purification device of the embodiment, for example, as the exhaust gas purification device according to the first embodiment, the inflow cell side catalyst layer is disposed on the inflow cell side surface of the partition wall, and the proportion of the filled portion filled with the inflow cell side catalyst layer in the pores present in the inflow cell side inner region of the partition wall is 40% or less at the reference position of the partition wall, thus allowing suppressing the increase of the pressure loss due to the accumulation of PM.

Subsequently, each configuration of the exhaust gas purification device according to the embodiment will be described in detail.

1. Honeycomb Substrate

The honeycomb substrate includes the porous partition wall defining the plurality of cells extending from the inflow side end surface to the outflow side end surface. The plurality of cells include the inflow cells and the outflow cells adjacent across the partition wall. The inflow cell has the open inflow side end and the sealed outflow side end, and the outflow cell has the sealed inflow side end and the open outflow side end. The honeycomb substrate is what is called a wall flow type honeycomb substrate.

The honeycomb substrate is a substrate in which the frame portion and the partition wall partitioning the space inside the frame portion into the honeycomb shape are integrally formed.

An axial length of the honeycomb substrate is not specifically limited and a common length can be used. For example, the length may be in a range of 10 mm or more and 500 mm or less, and in a range of 50 mm or more and 300 mm or less in some embodiments. A capacity of the honeycomb substrate, namely, a total volume of the cells is not specifically limited and a common capacity can be used. For example, the capacity is in a range of 0.1 L or more and 5 L or less in some embodiments.

While a material of the honeycomb substrate is not specifically limited and a common material can be used, examples of the material include, a ceramic, such as cordierite, silicon carbide (SiC), and aluminum titanate, and an alloy, such as a stainless steel.

While a shape of the frame portion is not specifically limited and a common shape can be used, examples of the shape include a tubular shape, such as an elliptical cylindrical shape and a polygonal cylindrical shape, in addition to a cylindrical shape. Other configurations of the frame portion are not specifically limited, and common configurations can be used.

A shape of the partition wall is not specifically limited, and a common shape can be used. While a length in the extending direction of the partition wall is not specifically limited, the length is usually approximately the same as the axial length of the honeycomb substrate. A thickness of the partition wall is not specifically limited and a common thickness can be used. For example, the thickness may be in a range of 50 μm or more and 2000 μm or less, and in a range of 100 μm or more and 1000 μm or less in some embodiments. This is because the thickness of the partition wall in these ranges allows obtaining a sufficient PM trap performance while ensuring a strength of the substrate, and the pressure loss can be sufficiently suppressed.

The partition wall has a porous structure comprising pores including a pore through which the exhaust gas can pass. A porosity of a part in which the catalyst layer is not disposed of the partition wall is not specifically limited and a common porosity can be used. For example, the porosity is in a range of 40% or more and 70% or less in some embodiments, and may be in a range of 50% or more and 70% or less. This is because the porosity which is equal to or more than the lower limits of these ranges allows effectively suppressing the pressure loss, and the porosity which is equal to or less than the upper limits of these ranges allows ensuring a sufficient mechanical strength. A mean pore size of the pores of the partition wall is not specifically limited and a common mean pore size can be used. For example, the mean pore size is in a range of 1 μm or more and 60 μm or less in some embodiments, and may be in a range of 5 μm or more and 30 μm or less. This is because the mean pore size of the pores within these ranges allows obtaining the sufficient PM trap performance, and the pressure loss can be sufficiently suppressed. The "mean pore size of the pores of the partition wall" means, for example, one measured by a method of mercury penetration.

The inflow cells and the outflow cells are formed by partitioning the space inside the frame portion with the partition wall, and adjacent across the partition wall. The inflow cells and the outflow cells are usually surrounded by the partition wall in a direction perpendicular to the extending direction.

The inflow cell has the outflow side end usually sealed by the sealing portion. The outflow cell has the inflow side end usually sealed by the sealing portion. A length in the extending direction of the sealing portion is not specifically limited and a common length may be used. For example, the length is in a range of 2 mm or more and 20 mm or less in some embodiments. A material of the sealing portion is not specifically limited and may be a common material.

Cross-sectional shapes perpendicular to the extending direction of the inflow cell and the outflow cell are not specifically limited and common shapes can be used. The cross-sectional shapes can be appropriately configured considering the flow rate, components, and the like of the exhaust gas passing through the exhaust gas purification device. Examples of the cross-sectional shape include a rectangular shape, such as a square, a polygon including a hexagon and the like, and a circular shape. Cross-sectional areas perpendicular to the extending direction of the inflow cell and the outflow cell are not specifically limited and common cross-sectional areas can be used. For example, the cross-sectional areas are in a range of 1 $mm^2$ or more and 7 $mm^2$ or less. While lengths in the extending direction of the inflow cell and the outflow cell are not specifically limited, the lengths are usually approximately the same as a length found by subtracting the length in the extending direction of the sealing portion from the axial length of the honeycomb substrate. Examples of an arrangement aspect of the inflow cells and the outflow cells include, like the arrangement aspect of the first embodiment, an aspect like a checkered pattern in which the inflow cells and the outflow cells are arranged in alternation.

2. Inflow Cell Side Catalyst Layer

The inflow cell side catalyst layer is disposed on the inflow cell side surface in the inflow cell side catalyst region extending from the inflow side end of the partition wall to the position apart by the distance of 10% or more of the length of the partition wall along the extending direction. At the reference position apart from the inflow side end of the partition wall by the distance of 10% of the length of the partition wall along the extending direction, the proportion of the filled portion filled with the inflow cell side catalyst layer in the pores present in the inner region up to the depth of 50% of the thickness of the partition wall from the inflow cell side surface of the partition wall is 40% or less.

Here, the proportion of the filled portion in the pores present in the inflow cell side inner region of the partition wall at the partition wall reference position means a proportion of an area of the filled portion relative to an area of the pores present in the inflow cell side inner region of the partition wall in a cross-sectional surface perpendicular to the extending direction at the partition wall reference position.

While the inflow cell side catalyst layer is not specifically limited insofar as the proportion of the filled portion in the pores present in the inflow cell side inner region of the partition wall at the partition wall reference position is 40% or less, the proportion is smaller in some embodiments, and may be 0%. This is because the increase of the pressure loss due to the accumulation of PM can be effectively suppressed. That is, the inflow cell side catalyst layer may be disposed or does not need to be disposed in the pores present in the inflow cell side inner region of the partition wall. When the inflow cell side catalyst layer is not disposed in the pores present in the inflow cell side inner region of the partition wall, the increase of the pressure loss due to the accumulation of PM can be especially effectively suppressed.

While the inflow cell side catalyst region of the partition wall is not specifically limited, the region may extend from the inflow side end of the partition wall to the position apart by the distance of 10% or more and 60% or less of the length of the partition wall along the extending direction (the position the distance of 10% or more and 60% or less of the length of the partition wall away from the inflow side end along the extending direction of the partition wall). This is because disposing the inflow cell side catalyst layer in the region allows suppressing the pressure loss before the PM is accumulated on the partition wall. The inflow cell side catalyst region of the partition wall may be a region extending from the inflow side end to the outflow side end of the partition wall along the extending direction, namely, the whole region in the extending direction of the partition wall. As the length in the extending direction of the inflow cell side catalyst region of the partition wall approaches 100% of the length in the extending direction of the partition wall, trapping amount (rate) of the PM can be improved.

While a thickness of the part on the inflow cell side surface of the partition wall in the inflow cell side catalyst layer is not specifically limited, for example, the thickness is in a range of 10% or more and 40% or less of the thickness of the partition wall in some embodiments. This is because the thickness equal to or more than the lower limit of this range allows effectively suppressing the increase of the pressure loss due to the accumulation of PM. That is because the thickness equal to or less than the upper limit of this range allows suppressing narrowing of an exhaust gas passage inside the inflow cell, thereby allowing effectively suppressing the pressure loss.

The inflow cell side catalyst layer usually includes the catalyst metal particles and the carrier that supports the catalyst metal particles. The inflow cell side catalyst layer is, for example, a sintered body including a carrier with catalyst supporting the catalyst metal particles on the carrier. The inflow cell side catalyst layer may include a carrier (promotor described later) that does not support the catalytic metal without including the catalytic metal and the carrier supporting the catalytic metal. In this case, while the inflow cell side catalyst layer cannot convert harmful components, such as carbon monoxide (CO), hydrocarbon (HC), and nitrogen oxide (NOx), the effect of suppressing the increase of the pressure loss due to the accumulation of PM can be obtained, thus allowing improving the filter performance to the PM.

While a material of the catalyst metal particles is not specifically limited and a common material can be used, examples of the material include a noble metal such as rhodium (Rh), palladium (Pd), and platinum (Pt). The material of the catalyst metal particles may be one metal or two or more metals, or may be an alloy containing two or more metals. The material of the catalyst metal particles is at least one of Pd, Pt, and the like in some embodiments.

While a mean particle size of the catalyst metal particles is not specifically limited and a common mean particle size can be used, the mean particle size is, for example, in a range of 0.1 nm or more and 20 nm or less in some embodiments. This is because the mean particle size equal to or less than the upper limit of the range allows increasing a contact area with the exhaust gas. The mean particle size of the catalyst metal particles means, for example, an average value obtained from particle sizes measured by a transmission electron microscope (TEM).

While a content of the catalyst metal particles is not specifically limited and a common content can be used, the content differs depending on the material of the catalyst metal particles. For example, when the material is Pd, Pt, or Rh, the content is in a range of 0.05 g or more and 5 g or less per liter of the honeycomb substrate in some embodiments. This is because the content equal to or more than the lower limit of the range can provide the sufficient catalytic action, and the content equal to or less than the upper limit of the range can suppress the grain growth of the catalyst metal particles and provide an advantage in the aspect of cost. Here, the content of the catalyst metal particles per liter of the substrate volume means a value obtained by dividing the mass of the catalyst metal particles contained in the inflow cell side catalyst layer by the volume of a part of the honeycomb substrate in the axial direction having the axial length which is the same as the length in the extending direction of the inflow cell side catalyst layer.

While a material of the carrier is not specifically limited, and a common material can be used, examples of the material include a metallic oxide, such as alumina ($Al_2O_3$), zirconia ($ZrO_2$), ceria ($CeO_2$), silica ($SiO_2$), magnesia (MgO), and titanium oxide ($TiO_2$), or a solid solution of them, such as an alumina-zirconia ($Al_2O_3$—$ZrO_2$) composite oxide and a ceria-zirconia ($CeO_2$—$ZrO_2$) composite oxide. The material of the carrier may be one or two or more among them. The material of the carrier is at least one of alumina, ceria-zirconia composite oxide, and the like in some embodiments.

While a shape of the carrier is not specifically limited, and a common shape can be used, the carrier is in powder form in some embodiments. This is because a larger specific surface area can be secured. A mean particle size D50 of the carrier in powder form is not specifically limited. For example, the mean particle size D50 is in a range of 1 μm or more and 15 μm or less in some embodiments, and may be in a range of 4 μm or more and 10 μm or less. This is because the mean particle size D50 equal to or more than the lower limits of these ranges can provide the sufficient heat resistant property, reduce the proportion of the filled portion in the pores present in the inflow cell side inner region of the partition wall to allow suppressing the pressure loss before the PM is accumulated on the partition wall, and further, effectively suppress the increase of the pressure loss due to the accumulation of PM. That is because the mean particle size D50 equal to or less than the upper limits of these ranges sufficiently ensures the dispersibility of the catalyst metal particles, thus allowing effectively improving the purification performance. The mean particle size D50 of the carrier in powder form is obtained by, for example, laser diffraction and scattering, and can be measured using, for example, a laser scattering particle size distribution analyzer LA-960 (manufactured by HORIBA, Ltd.).

A mass ratio of the catalyst metal particles to a total mass of the catalyst metal particles and the carrier is not specifically limited, and a common mass ratio can be used. For example, the mass ratio is in a range of 0.01 mass % or more and 10 mass % or less in some embodiments. This is because the mass ratio equal to or more than the lower limit of this range can provide the sufficient catalytic action, and the mass ratio equal to or less than the upper limit of this range can suppress the grain growth of the catalyst metal particles and provide an advantage in the aspect of cost.

While a method that causes the carrier to support the catalyst metal particles is not specifically limited, and a common method can be used, examples of the method include a method in which the carrier is immersed in an aqueous solution containing a catalytic metal salt (such as nitrate) or a catalytic metal complex (such as tetraamine complex) and subsequently dried and fired.

The inflow cell side catalyst layer may include a promotor that does not support the catalyst metal particles in addition to the catalyst metal particles and the carrier. While a material of the promotor is not specifically limited, and a common material can be used, examples of the material include a material similar to the material of the carrier. While a shape of the promotor is not specifically limited, and a common shape can be used, examples of the shape include a shape similar to the shape of the carrier. While a mean particle size of the promotor in powder form is not specifically limited, examples of the mean particle size include a mean particle size similar to the mean particle size of the carrier in powder form. A mass ratio of the promotor to a total mass of the catalyst metal particles, the carrier, and the promotor is not specifically limited, and a common mass ratio can be used. For example, the mass ratio is in a range of 30 mass % or more and 80 mass % or less in some embodiments.

While a density of the inflow cell side catalyst layer is not specifically limited, for example, the density is in a range of 5 g/L or more and 250 g/L or less in some embodiments, and may be in a range of 5 g/L or more and 100 g/L or less, or may be in a range of 10 g/L or more and 65 g/L or less. This is because the density of the inflow cell side catalyst layer equal to or more than the lower limits of these ranges allows effectively improving the purification performance, allows suppressing entering of the PM in the inflow cell side inner region of the partition wall by the inflow cell side catalyst layer, and allows the sufficient accumulation of PM, thereby allowing effectively suppressing the increase of the pressure loss due to the accumulation of PM. That is because the density of the inflow cell side catalyst layer equal to or less than the upper limits of these ranges allows effectively suppressing the pressure loss. The "density of the inflow cell side catalyst layer" means a value obtained by dividing the mass of the inflow cell side catalyst layer by the volume of a part of the honeycomb substrate in the axial direction having the axial length which is the same as the length in the extending direction of the inflow cell side catalyst layer.

While a method for forming the inflow cell side catalyst layer is not specifically limited, and a common method can be used, examples of the method include a method in which a slurry prepared by mixing the catalyst metal particles and the carrier supporting the catalyst metal particles with a solvent is supplied on the inflow cell side surface in the inflow cell side catalyst region of the partition wall, and subsequently, the slurry is dried and fired.

The slurry may contain any given component such as a promotor, a binder, and an additive as necessary in addition to the catalyst metal particles and the carrier, and the solvent. The mean particle sizes and the like of the solid content, such as the carrier in powder form and the promotor, contained in the slurry may be appropriately adjusted so as to reduce the proportion of the filled portion filled with the inflow cell side catalyst layer in the pores present in the inflow cell side inner region of the partition wall by suppressing the penetration of the slurry into the pores present in the inflow cell side inner region of the partition wall.

While the method for preparing the slurry is not specifically limited, for example, a method below is included. First, a carrier (such as alumina) in powder form is immersed in a solution (such as an aqueous solution containing Pt nitrate) containing a catalytic metal salt (such as Pt nitrate) or a catalytic metal complex, and subsequently they are dried and fired, thus preparing a noble metal supporting powder (such as Pt supporting powder) supporting a noble metal (such as Pt). Next, a promotor (for example, barium sulfate and a ceria-zirconia complex oxide), a binder, and an ion exchanged water are added to the noble metal supporting powder, and they are sufficiently stirred and wet-ground so as to have a mean particle size D50 of the solid contents as a desired value. Thus, the slurry is prepared.

While the mean particle size D50 of the solid contents of the slurry is not specifically limited, for example, the mean particle size D50 is in a range of 1/10 or more and 2/3 or less of a mean pore size (MPS) (for example, in a range of 10 μm to 20 μm) of the pores in the partition wall of the honeycomb substrate in some embodiments, and may be in a range of 1/4 or more and 2/3 or less of the mean pore size of the pores in the partition wall of the honeycomb substrate. Specifically, for example, the mean particle size D50 is in a range of 1 μm or more and 15 μm or less in some embodiments, and may be in a range of 4 μm or more and 10 μm or less. This is because the mean particle size D50 of the solid contents of the slurry equal to or more than the lower limits of these ranges can provide the sufficient heat resistant property, and suppress entering of the solid contents of the slurry in the pores of the partition wall, thereby disposing the solid contents of the slurry on the inflow cell side surface of the partition wall. Therefore, by reducing the proportion of the filled portion in the pores present in the inflow cell side inner region of the partition wall, the pressure loss before the PM is accumulated on the partition wall can be suppressed, and further, the increase of the pressure loss due to the accumulation of PM can be effectively suppressed. That is because the mean particle size D50 of the solid contents of the slurry equal to or less than the upper limits of these ranges sufficiently ensures the dispersibility of the catalyst metal particles, thus allowing effectively improving the purification performance. The mean particle size D50 of the solid contents of the slurry can be measured using, for example, a laser scattering particle size distribution analyzer LA-960 (manufactured by HORIBA, Ltd.).

With the method in which the slurry is supplied on the inflow cell side surface in the inflow cell side catalyst region of the partition wall, the slurry may be supplied to the pores present in the inner region up to the depth of 50% of the thickness of the partition wall from the inflow cell side surface in the inflow cell side catalyst region of the partition wall insofar as the proportion of the filled portion in the pores present in the inflow cell side inner region of the partition wall is 40% or less at the partition wall reference position.

The method for supplying the slurry on the inflow cell side surface in the inflow cell side catalyst region of the partition wall is not specifically limited, and a common method can be used. Examples of the method include a method in which the honeycomb substrate is immersed in the slurry from the inflow side and taken out from the slurry after the elapse of a predetermined period. In this method, a pressure difference between the outflow cell and the inflow cell may be generated by applying a pressure to the outflow cell from the outflow side so as to reduce the proportion of the filled portion in the pores present in the inflow cell side inner region of the partition wall by suppressing the penetration of the slurry into the pores present in the inner region up to the depth of 50% of the thickness of the partition wall from the inflow cell side surface in the inflow cell side catalyst region of the partition wall. The property or the like, such as a solid content concentration of the slurry and a viscosity of the slurry, may be adjusted as necessary, for example, for obtaining the similar action. As the method for supplying the slurry on the inflow cell side surface in the inflow cell side catalyst region of the partition wall, a method in which the slurry is blown off using a blower so as not to supply the slurry to unnecessary parts in the inner region and on the surface of the partition wall when the slurry is supplied may be used.

In the method in which the slurry is dried and fired after the slurry is supplied on the inflow cell side surface in the inflow cell side catalyst region of the partition wall, the drying condition is not specifically limited. While the drying condition depends on the shapes, the dimensions, and the like of the honeycomb substrate, the carrier, and the like, the drying condition may be a condition, for example, in which the drying is performed at a temperature in a range of 80° C. or more and 300° C. or less for a period in a range of one hour or more and 10 hours or less. While the firing condition is not specifically limited, for example, the firing condition may be a condition in which the firing is performed at a temperature in a range of 400° C. or more and 1000° C. or less for a period in a range of one hour or more and four hours or less. In the drying and firing method, specifically, for example, a condition in which the substrate after supplied with the slurry is dried by heating at 120° C. for two hours using a dryer to remove water content, and subsequently, the substrate is fired at 500° C. for two hours using an electric furnace may be employed.

The proportion of the filled portion in the pores present in the inflow cell side inner region of the partition wall can be adjusted also by the supply amount of the slurry, the drying condition, the firing condition, and the like. The property and the like, such as a thickness of a part on the inflow cell side surface of the partition wall in the inflow cell side catalyst layer and a porosity of the inflow cell side catalyst layer, can be adjusted by the solid content concentration of the slurry, the property of the slurry, the supply amount of the slurry, the drying condition, the firing condition, and the like.

3. Exhaust Gas Purification Device

The exhaust gas purification device includes the honeycomb substrate and the inflow cell side catalyst layers. The exhaust gas purification device usually further includes sealing portions sealing outflow side ends of the inflow cells and sealing portions sealing inflow side ends of the outflow cells.

(1) Outflow Cell Side Catalyst Layer

The exhaust gas purification device may further include an outflow cell side catalyst layer disposed in an outflow cell side catalyst region extending from the outflow side end of the partition wall to a position apart toward the inflow side along the extending direction as the exhaust gas purification device according to the first embodiment.

The outflow cell side catalyst region of the partition wall is not specifically limited insofar as the region extends from the outflow side end of the partition wall to the position apart toward the inflow side along the extending direction. For example, the outflow cell side catalyst region is a region extending from the outflow side end of the partition wall to a position overlapping the inflow cell side catalyst region along the extending direction in some embodiments. This is because it can be suppressed that the exhaust gas transmits through a region of the partition wall in which the catalyst layer is not disposed and is discharged from the exhaust gas purification device without being purified.

The outflow cell side catalyst layer may be disposed in a pores present in an inner region in the outflow cell side in the outflow cell side catalyst region of the partition wall, or may be disposed on an outflow cell side surface in the outflow cell side catalyst region of the partition wall. The outflow cell side catalyst layer may be disposed in the pores present in the inner region as well as on the surface in the outflow cell side in the outflow cell side catalyst region of the partition wall.

In these outflow cell side catalyst layers, one disposed in the pores present in the inner region in the outflow cell side of the partition wall increases the gas permeability of the partition wall portion including the outflow cell side catalyst region of the partition wall and the outflow cell side catalyst layer, thus allowing effectively suppressing the pressure loss. One disposed on the outflow cell side surface in the outflow cell side catalyst region of the partition wall increases an area contacting with the exhaust gas flowed into the outflow cell, thus allowing effectively improving the purification performance. Furthermore, one disposed in the pores present in the inner region as well as on the surface in the outflow cell side of the partition wall can provide both of suppressing the pressure loss and improving the purification performance.

The outflow cell side catalyst layer usually includes catalyst metal particles and a carrier supporting the catalyst metal particles, and is, for example, a sintered body including a carrier with catalyst in which the catalyst metal particles are supported by the carrier.

A material of the catalyst metal particles is similar to the material of the catalyst metal particles included in the inflow cell side catalyst layer except that rhodium (Rh) or the like is used in some embodiments. Therefore, the explanation is omitted here. Since a mean particle size of the catalyst metal particles is similar to that of the catalyst metal particles included in the inflow cell side catalyst layer, the explanation is omitted here.

While a content of the catalyst metal particles is not specifically limited and a common content can be used, the content differs depending on the material of the catalyst metal particles. For example, when the material is Rh, Pd, or Pt, the content is in a range of 0.01 g or more and 2 g or less per liter of the honeycomb substrate in some embodiments. This is because the content equal to or more than the lower limit of the range can provide the sufficient catalytic action, and the content equal to or less than the upper limit of the range can suppress the grain growth of the catalyst metal particles and provide an advantage in the aspect of cost. Here, the content of the catalyst metal particles per liter of the substrate volume means a value obtained by dividing the mass of the catalyst metal particles contained in the outflow cell side catalyst layer by the volume of a part of the honeycomb substrate in the axial direction having the axial length which is the same as the length in the extending direction of the outflow cell side catalyst layer.

Since a material and a shape of the carrier are similar to those of the carrier included in the inflow cell side catalyst layer, the explanation is omitted here. A mean particle size D50 of the carrier in powder form is not specifically limited, and a common mean particle size can be used. Since a method for measuring the mean particle size D50 of the carrier is similar to the method for measuring the mean particle size D50 of the carrier included in the inflow cell side catalyst layer, the explanation is omitted here. Since a mass ratio of the catalyst metal particles to a total mass of the catalyst metal particles and the carrier is similar to that in the inflow cell side catalyst layer, the explanation is omitted here. Since a method that causes the carrier to support the catalyst metal particles is similar to that in the inflow cell side catalyst layer, the explanation is omitted here. The outflow cell side catalyst layer may include a promotor similarly to the inflow cell side catalyst layer. Since the promotor is similar to the promotor included in the inflow cell side catalyst layer, the explanation is omitted here.

While a density of the outflow cell side catalyst layer is not specifically limited, the density is in a range of 30 g/L or more and 250 g/L or less in some embodiments. This is because the density of the outflow cell side catalyst layer equal to or more than the lower limit of the range allows effectively improving the purification performance. That is because the density of the outflow cell side catalyst layer equal to or less than the upper limit of the range allows effectively suppressing the pressure loss. The "density of the outflow cell side catalyst layer" means a value obtained by dividing the mass of the outflow cell side catalyst layer by the volume of a part of the honeycomb substrate in the axial direction having the axial length which is the same as the length in the extending direction of the outflow cell side catalyst layer.

While a method for forming the outflow cell side catalyst layer is not specifically limited, and a common method can be used, examples of the method include a method in which a slurry prepared by mixing the catalyst metal particles and the carrier supporting the catalyst metal particles with a solvent is supplied to at least one of the pores present in the inner region and the surface in the outflow cell side in the outflow cell side catalyst region of the partition wall, and subsequently, the slurry is dried and fired.

Since the slurry is similar to the slurry used for forming the inflow cell side catalyst layer except that the catalyst metal particles and the carrier included in the outflow cell side catalyst layer are contained instead of the catalyst metal particles and the carrier included in the inflow cell side catalyst layer, the explanation is omitted here. Since a method for preparing the slurry is similar to that of the slurry used for forming the inflow cell side catalyst layer, the explanation is omitted here. A mean particle size D50 of the solid contents of the slurry is not specifically limited, and a common mean particle size can be used. Since a method for measuring the mean particle size D50 of the solid contents of the slurry is similar to the method for measuring the mean particle size D50 of the solid contents of the slurry used for forming the inflow cell side catalyst layer, the explanation is omitted here.

The method for supplying the slurry to at least one of the pores present in the inner region and the surface in the outflow cell side in the outflow cell side catalyst region of the partition wall is not specifically limited, and a common method can be used. Examples of the method includes a method in which the honeycomb substrate is immersed in the slurry from the outflow side and taken out from the slurry after the elapse of a predetermined period. In this method, the property of the slurry, such as a solid content concentration and a viscosity, may be appropriately adjusted so as to supply the slurry to the pores present in the inner region in the outflow cell side of the partition wall. A pressure difference between the inflow cell and the outflow cell may be generated by applying a pressure to the inflow cell from the inflow side so as not to supply the slurry to the pores present in the inner region in the outflow cell side of the partition wall. The property, such as a solid content concentration of the slurry and a viscosity of the slurry, may be adjusted as necessary so as not to supply the slurry to the pores present in the inner region in the outflow cell side of the partition wall. As the method for supplying the slurry to at least one of the pores present in the inner region and the surface in the outflow cell side in the outflow cell side catalyst region of the partition wall, a method in which the slurry is blown off using a blower so as not to supply the slurry to unnecessary parts in the inner region and on the surface of the partition wall when the slurry is supplied may be used.

The drying condition and the firing condition in the method in which the slurry is dried and fired after the slurry is supplied to at least one of the pores present in the inner region and the surface in the outflow cell side in the outflow cell side catalyst region of the partition wall are similar to the drying condition and the firing condition used for forming the inflow cell side catalyst layer. Therefore, the explanation is omitted here.

The property and the like, such as a thickness and a porosity of the outflow cell side catalyst layer, can be adjusted by the solid content concentration of the slurry, the property of the slurry, the supply amount of the slurry, the drying condition, the firing condition, and the like.

(2) Others

When the exhaust gas purification device further includes the outflow cell side catalyst layer, as the exhaust gas purification device according to the first embodiment, the catalyst metal particles included in the inflow cell side catalyst layer contain at least one of palladium (Pd) and platinum (Pt), and the catalyst metal particles included in the outflow cell side catalyst layer contain rhodium (Rh) in some embodiments. This is because since the exhaust gas contacts the outflow cell side catalyst layer after hydrocarbon (HC) included in the exhaust gas is effectively converted by the catalyst metal particles included in the inflow cell side catalyst layer, poisoning of rhodium (Rh) contained in the catalyst metal particles included in the outflow cell side catalyst layer by hydrocarbon (HC) can be suppressed.

EXAMPLES

The following further specifically describes the exhaust gas purification device according to the embodiment with examples and comparative examples.

Figure 3:
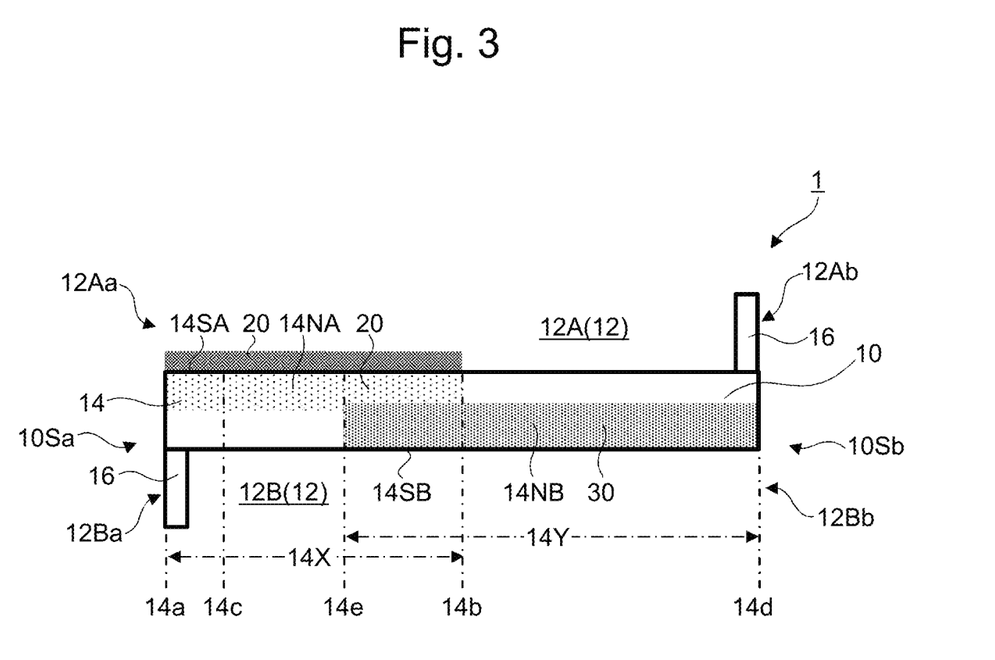
FIG. 3 is a cross-sectional view schematically illustrating each of the main parts taken along a surface parallel to the extending direction of the cell in the exhaust gas purification devices produced in Comparative Examples 1 and 2 and Examples 1 to 3.

Exhaust gas purification devices of Comparative Examples 1 and 2 and Examples 1 to 3 were produced, and the proportion of the filled portion in the pores in the inflow cell side inner region of the partition wall at the partition wall reference position and the pressure loss at the PM accumulation were evaluated for each of the exhaust gas purification devices below. Here, FIG. 3 is a cross-sectional view schematically illustrating each of the main parts taken along a surface parallel to the extending direction of the cell in the exhaust gas purification devices produced in Comparative Examples 1 and 2 and Examples 1 to 3.

Comparative Example 1

First, a GPF that included a honeycomb substrate 10 and sealing portions 16 and was not coated with a catalyst was prepared. The honeycomb substrate 10 is a substrate in which a cylindrical-shaped frame portion (not illustrated) and a partition wall 14 partitioning a space inside the frame portion into a honeycomb shape are integrally formed. The partition wall 14 is a porous body that defines a plurality of cells 12 extending from an inflow side end surface 10Sa to an outflow side end surface 10Sb of the honeycomb substrate 10. The plurality of cells 12 include inflow cells 12A and outflow cells 12B adjacent across the partition wall 14. The inflow cell 12A has an open inflow side end 12Aa and an outflow side end 12Ab sealed by the sealing portion 16. The outflow cell 12B has an inflow side end 12Ba sealed by the sealing portion 16 and an open outflow side end 12Bb. Details of the configurations of the honeycomb substrate 10 and the sealing portion 16 in the GPF are as follows.

(Configuration of Honeycomb Substrate and Sealing Portion of GPF)

Material of Honeycomb Substrate: Cordierite

Size of Honeycomb Substrate: Outer Diameter×Axial Length=117 mm×122 mm

Thickness of Partition Wall: 200 μm

Mean Pore Size of Pores in Partition wall: 15 μm

Cell Density: 300 cells per square inch

Length in Extending Direction of Sealing Portion: 4 mm

Next, a carrier with catalyst in which catalyst metal particles were supported by a carrier in powder form was mixed with a solvent, thus preparing a slurry for inflow cell side catalyst layer. Specifically, alumina in powder form (type: type 1, bulk density: 0.35 g/mL) (carrier) was immersed in an aqueous solution containing Pt nitrate (catalytic metal salt), and subsequently, they were dried and fired, thus preparing a Pt supporting powder supporting Pt by 2.5 pts·mass relative to alumina in powder form of 97.5 pts·mass. Next, barium sulfate (promotor 1) of 2 pts·mass and a ceria-zirconia complex oxide (promotor 2) of 5 pts·mass, a binder of 2 pts·mass, and an ion exchanged water were added to the Pt supporting powder of 35 pts·mass, and they were sufficiently stirred and wet-ground so as to have a mean particle size D50 of solid contents which is 6 μm. Thus, the slurry for inflow cell side catalyst layer was prepared.

Note that, in the solid contents of the slurry for inflow cell side catalyst layer, the mass ratio between the alumina (carrier) and the ceria-zirconia complex oxide (promotor 2) is 7:1.

Next, the slurry for inflow cell side catalyst layer was poured into the inflow cell 12A from the inflow side end 12Aa, thereby supplying the slurry for inflow cell side catalyst layer on an inflow cell side surface 14SA in an inflow cell side catalyst region 14X of the partition wall 14. The inflow cell side catalyst region 14X of the partition wall 14 is a region extending from the inflow side end 14a of the partition wall 14 to a position 14b apart by a distance of 50% of the length of the partition wall 14 along the extending direction. When the slurry was supplied, the slurry was blown off using a blower so as not to supply the slurry to unnecessary parts in the inner region and on the surface of the partition wall. Subsequently, the honeycomb substrate 10 to which the slurry for inflow cell side catalyst layer was supplied was dried by heating at 120° C. for two hours using a dryer to remove water content, and subsequently, the honeycomb substrate 10 was fired at 500° C. for two hours using an electric furnace. Thus, an inflow cell side catalyst layer 20 was formed.

Next, a carrier with catalyst in which catalyst metal particles were supported by a carrier in powder form was mixed with a solvent, thus preparing a slurry for outflow cell side catalyst layer. Specifically, a ceria-zirconia complex oxide (carrier) in powder form was immersed in an aqueous solution containing Rh nitrate (catalytic metal salt), and subsequently, they were dried and fired, thus preparing a Rh supporting powder supporting Rh by 0.5 pts·mass relative to the ceria-zirconia complex oxide in powder form of 99.5 pts·mass. Next, alumina (promotor) of 21 pts·mass, a binder of 2 pts·mass, and an ion exchanged water were added to the Rh supporting powder of 85 pts·mass, and they were sufficiently stirred and wet-ground so as to have a mean particle size D50 of solid contents which is 1.5 μm. Thus, the slurry for outflow cell side catalyst layer was prepared.

Next, the slurry for outflow cell side catalyst layer was poured into the outflow cell 12B from the outflow side end 12Bb, thereby supplying the slurry for outflow cell side catalyst layer to an outflow cell side inner region 14NB in an outflow cell side catalyst region 14Y of the partition wall 14. The outflow cell side catalyst region 14Y of the partition wall 14 is a region extending from the outflow side end 14d of the partition wall 14 to a position 14e apart by a distance of 70% of the length of the partition wall 14 along the extending direction. When the slurry was supplied, the slurry was blown off using a blower so as not to supply the slurry to unnecessary parts in the inner region and on the surface of the partition wall. Subsequently, the honeycomb substrate 10 to which the slurry for outflow cell side catalyst layer was supplied was dried by heating at 120° C. for two hours using a dryer to remove water content, and subsequently, the honeycomb substrate 10 was fired at 500° C. for two hours using an electric furnace. Thus, an outflow cell side catalyst layer 30 was formed.

As described above, as illustrated in FIG. 3, the exhaust gas purification device 1 that includes the honeycomb substrate 10, the sealing portion 16, the inflow cell side catalyst layer 20, and the outflow cell side catalyst layer 30 was produced. The density of the inflow cell side catalyst layer 20 was 25 g/L, and the Pt content in the inflow cell side catalyst layer 20 was 0.6 g/L. The density of the outflow cell side catalyst layer 30 was 75 g/L, and the Rh content in the outflow cell side catalyst layer 30 was 0.3 g/L.

Comparative Example 2

The exhaust gas purification device 1 was produced by a producing method similar to that of Comparative Example 1 except that the wet grinding was performed so as to have the mean particle size D50 of the solid contents which is 3 μm in the preparation of the slurry for inflow cell side catalyst layer. In Comparative Example 2, the density of the inflow cell side catalyst layer 20 was 25 g/L, and the Pt content in the inflow cell side catalyst layer 20 was 0.6 g/L. The density of the outflow cell side catalyst layer 30 was 75 g/L, and the Rh content in the outflow cell side catalyst layer 30 was 0.3 g/L.

Example 1

The exhaust gas purification device 1 was produced by a producing method similar to that of Comparative Example 1 except that, in the preparation of the slurry for inflow cell side catalyst layer, barium sulfate (promotor 1) of 2 pts·mass and a ceria-zirconia complex oxide (promotor 2) of 5 pts·mass, a binder of 2 pts·mass, and an ion exchanged water were added to the Pt supporting powder of 20 pts·mass, and they were sufficiently stirred and wet-ground so as to have a mean particle size D50 of solid contents which is 6 μm, thereby making the mass ratio between the alumina (carrier) and the ceria-zirconia complex oxide (promotor 2) in the solid contents of the slurry for inflow cell side catalyst layer 4:1. In Example 1, the density of the inflow cell side catalyst layer 20 was 15 g/L, and the Pt content in the inflow cell side catalyst layer 20 was 0.6 g/L. The density of the outflow cell side catalyst layer 30 was 75 g/L, and the Rh content in the outflow cell side catalyst layer 30 was 0.3 g/L.

Example 2

The exhaust gas purification device 1 was produced by a producing method similar to that of Comparative Example 1 except that, in the preparation of the slurry for inflow cell side catalyst layer, alumina in powder form (type: type 2, bulk density: 0.65 g/mL) was used instead of alumina in powder form (type: type 1, bulk density: 0.35 g/mL).

In Example 2, the density of the inflow cell side catalyst layer 20 was 25 g/L, and the Pt content in the inflow cell side catalyst layer 20 was 0.6 g/L. The density of the outflow cell side catalyst layer 30 was 75 g/L, and the Rh content in the outflow cell side catalyst layer 30 was 0.3 g/L.

Example 3

The exhaust gas purification device 1 was produced by a producing method similar to that of Comparative Example 1 except that, in the preparation of the slurry for inflow cell side catalyst layer, an alumina-zirconia complex oxide in powder form (bulk density: 1.1 g/mL) was used instead of alumina in powder form (type: type 1, bulk density: 0.35 g/mL). In Example 3, the density of the inflow cell side catalyst layer 20 was 25 g/L, and the Pt content in the inflow cell side catalyst layer 20 was 0.6 g/L. The density of the outflow cell side catalyst layer 30 was 75 g/L, and the Rh content in the outflow cell side catalyst layer 30 was 0.3 g/L.

[Proportion of Filled Portion in Pores in Inflow Cell Side Inner Region of Partition Wall at Partition Wall Reference Position]

For each of the exhaust gas purification devices 1 produced in Comparative Examples 1 and 2 and Examples 1 to 3, the proportion of the filled portion filled with the inflow cell side catalyst layer 20 in the pores present in the inner region 14NA up to the depth of 50% of the thickness of the partition wall 14 from the inflow cell side surface 14SA of the partition wall 14 was obtained at the reference position 14c apart from the inflow side end 14a of the partition wall 14 by the distance of 10% of the length of the partition wall 14 along the extending direction.

Specifically, first, for the exhaust gas purification device of each example, an image of a cross-sectional surface perpendicular to the extending direction at the partition wall reference position was taken by FE-SEM. Subsequently, in the image of the cross-sectional surface perpendicular to the extending direction at the partition wall reference position taken by X-ray CT for each example, an unfilled portion excluding the filled portion filled with the inflow cell side catalyst layer in the pores present in the inflow cell side inner region of the partition wall was determined with luminance or the like of respective portions as determination criteria by an automatic determination using image analysis software ImageJ (specifically, see "Rasband, W. S., ImageJ, U.S. National Institutes of Health, Bethesda, Maryland, USA, http://rsb.info.nih.gov/ij/, 1997-2012."). Subsequently, an area of the unfilled portion (pore portion after forming the catalyst layer) in the pores present in the inflow cell side inner region of the partition wall in the cross-sectional surface of the partition wall was measured. Thus, the proportion of the area of the filled portion in the pores to the area of the pores present in the inflow cell side inner region of the partition wall in the cross-sectional surface of the partition wall was calculated from the area of the unfilled portion in the pores and an area of the pores (pore portion) present in the inflow cell side inner region of the partition wall in the cross-sectional surface of the partition wall, which was obtained by a manufacturer of the honeycomb substrate in advance, and the proportion was obtained as the proportion of the filled portion in the pores present in the inflow cell side inner region of the partition wall.

Figure 4A:
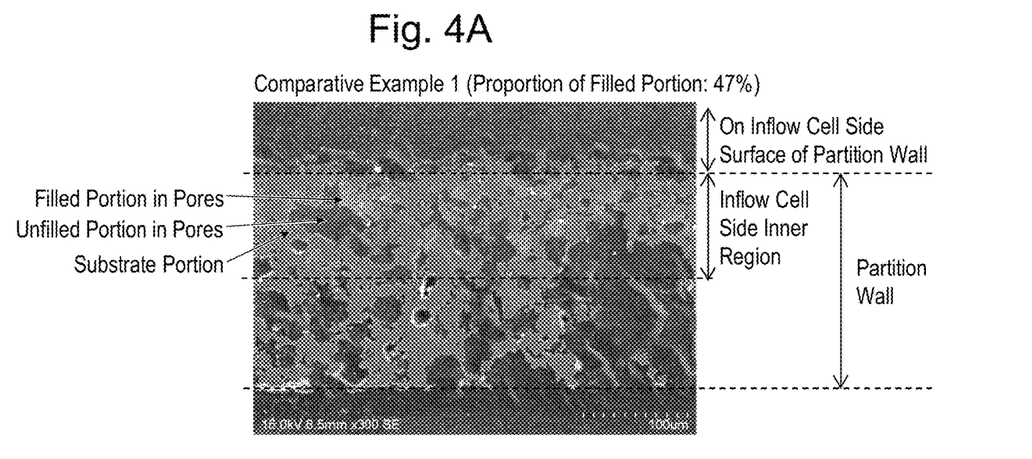
FIGS. 4A and 4B are each an image of a cross-sectional surface perpendicular to the extending direction at a reference position of a partition wall taken by FE-SEM in Comparative Examples 1 and 2.
Figure 4B:
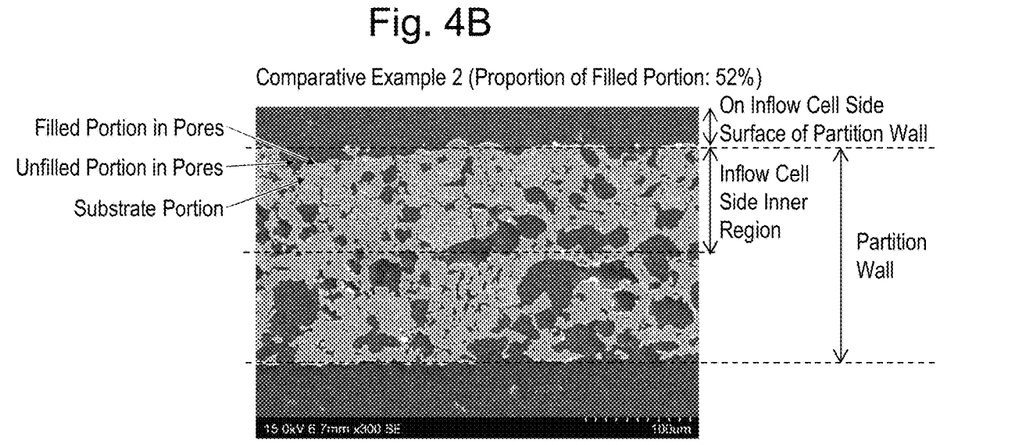
Figure 4C:
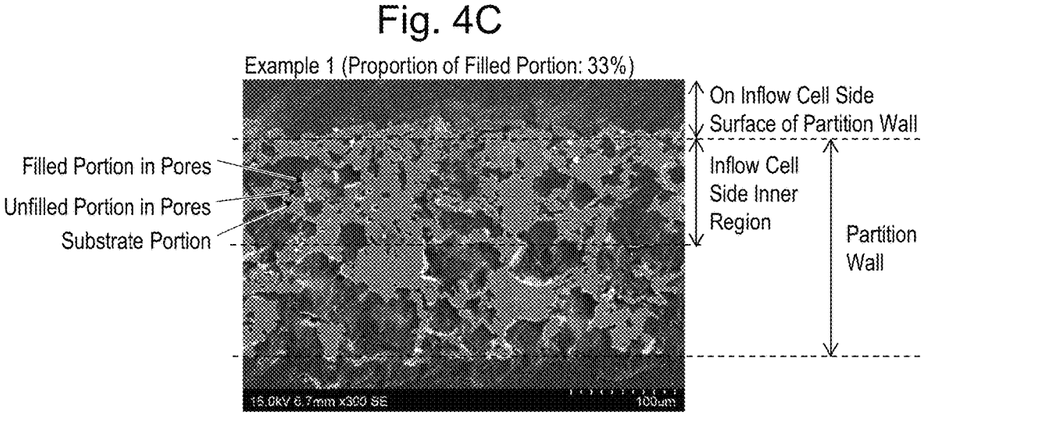
FIGS. 4C-4E are each an image of a cross-sectional surface perpendicular to the extending direction at the reference position of the partition wall taken by FE-SEM in Examples 1 to 3.
Figure 4D:
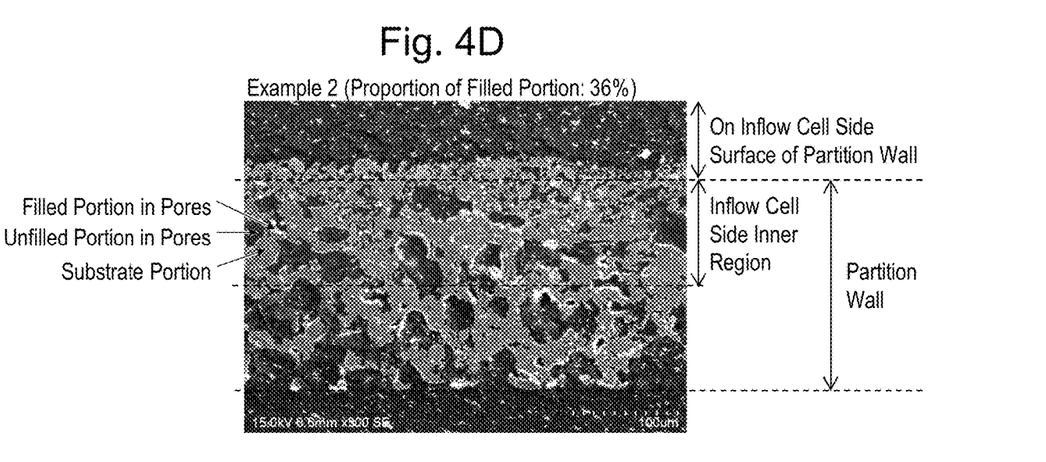
Figure 4E:
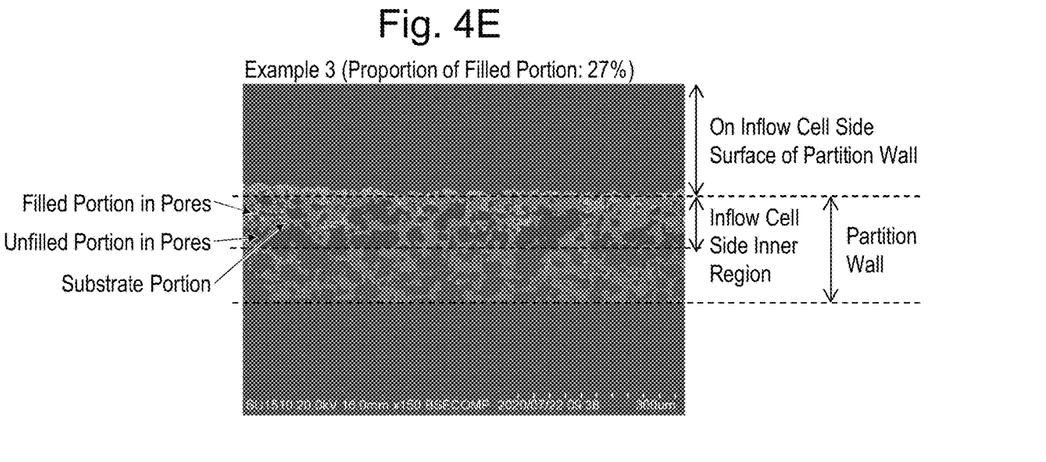

FIGS. 4A and 4B are each an image of a cross-sectional surface perpendicular to the extending direction at the reference position of the partition wall taken by FE-SEM in Comparative Examples 1 and 2. FIGS. 4C-4E are each an image of a cross-sectional surface perpendicular to the extending direction at the reference position of the partition wall taken by FE-SEM in Examples 1 to 3. In these images, positions of the filled portion and the unfilled portion in the pores and the substrate portion present in the inflow cell side inner region of the partition wall are indicated. Table 1 below indicates the proportion of the filled portion in the pores in the inflow cell side inner region of the partition wall for each example.

As illustrated in FIGS. 4A-4E and Table 1 below, the proportion of the filled portion of the inflow cell side catalyst layer in the pores in the inflow cell side inner region of the partition wall exceeded 40% in Comparative Examples 1 and 2. Meanwhile, the proportion of the filled portion in the pores in the inflow cell side inner region of the partition wall was 40% or less in Examples 1 to 3.

[Pressure Loss at PM Accumulation]

For each of the exhaust gas purification devices produced in Comparative Examples 1 and 2 and Examples 1 to 3, the pressure loss at the PM accumulation and an amount of NOx processed at 350° C. were measured.

Figure 5:
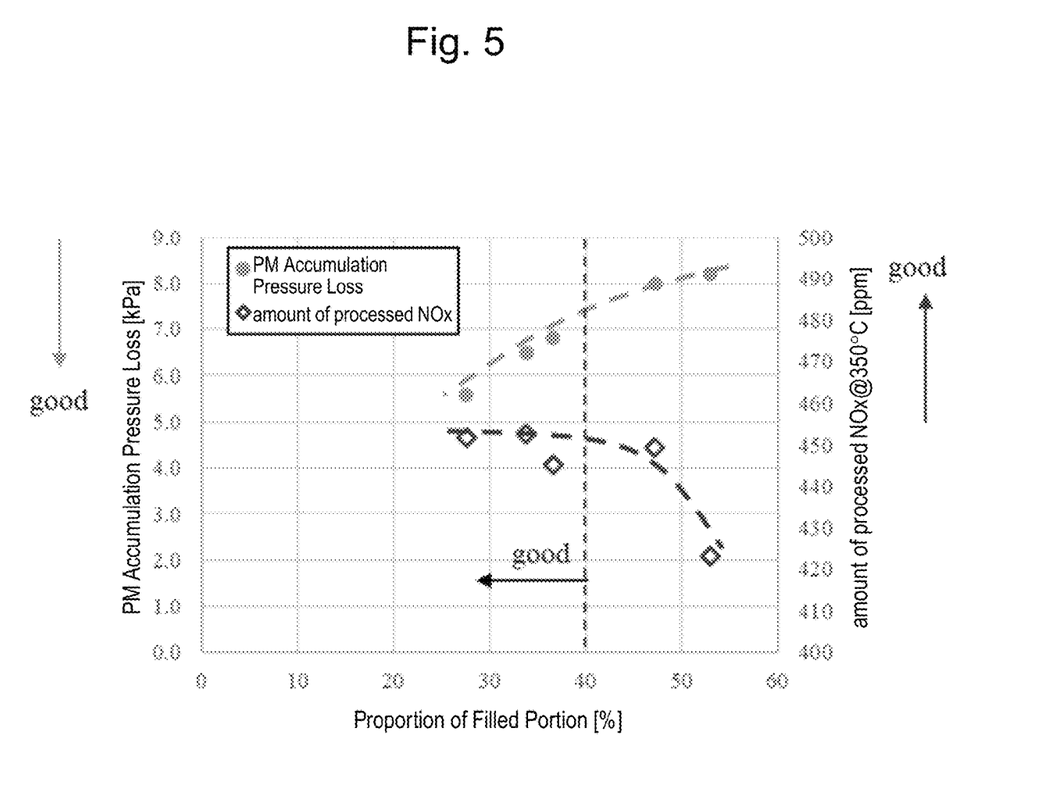
FIG. 5 is a graph illustrating the pressure loss at the PM accumulation and the amounts of the processed NOx relative to the proportion of the filled portion in the pores in inflow cell side inner region of the partition wall in Comparative Examples 1 and 2 and Examples 1 to 3.

Specifically, first, the exhaust gas purification devices of the respective examples were each mounted to an exhaust system of a 2 L diesel engine. Subsequently, in a state where the diesel engine was operated at an engine rotation speed of 1600 rpm×30 Nm to cause an exhaust gas at an inlet gas temperature of 200° C. to flow through the exhaust gas purification device, the pressure loss [kPa] when 3 g of the PM was accumulated per liter of the honeycomb substrate was measured and obtained as the pressure loss at the PM accumulation. Table 1 below indicates the pressure loss at the PM accumulation for each example. Furthermore, the exhaust gas purification devices of the respective examples were each mounted as a second catalyst to a lower portion of a start-up catalyst in an exhaust system of a 2.5 L gasoline engine. Subsequently, in a state where the gasoline engine was operated at an engine rotation speed of 3000 rpm×45 Nm with an air-fuel ratio (A/F) changed cyclically in the range of 14.1 to 15.1, thereby causing an exhaust gas at an inlet gas temperature of 350° C. to flow through the exhaust gas purification device, the NOx concentrations were measured by analyzers disposed in the front and the back of the exhaust gas purification device, and a difference between them was obtained as the amount [ppm] of the NOx processed at 350° C. FIG. 5 is a graph illustrating the pressure loss at the PM accumulation and the amount of the processed NOx relative to the proportion of the filled portion in the pores in the inflow cell side inner region of the partition wall in Comparative Examples 1 and 2 and Examples 1 to 3.

As illustrated in FIG. 5 and Table 1 below, as the proportion of the filled portion in the pores in the inflow cell side inner region of the partition wall decreased, the pressure loss at the PM accumulation decreased, and when the proportion of the filled portion in the pores in the inflow cell side inner region of the partition wall became 40% or less, the pressure loss at the PM accumulation especially significantly decreased. It was found that, in this case, the amount of the processed NOx significantly increased, and the coated catalyst layer was effectively used.

TABLE 1

| | Component of Slurry for Inflow Cell Side Catalyst Layer | | | | Particle Size of Solid Content of Slurry for Inflow Cell Side | Density of Inflow Cell Side | Density of Outflow Cell Side | Proportion | Pressure | Amount of |
|---|---|---|---|---|---|---|---|---|---|---|
| | Carrier | Promotor 1 | Promotor 2 | Mass Ratio (Carrier:Promotor 2) | Catalyst Layer [μm] | Catalyst Layer [g/L] | Catalyst Layer [g/L] | of Filled Portion [%] | Loss at PM Accumulation [kPa] | Processed NOx [ppm] |
| Comparative Example 1 | Alumina (Type 1) | Barium Sulfate | Ceria-Zirconia | 7:1 | 6 | 25 | 75 | 47 | 8.0 | 449 |

TABLE 1-continued

| | Component of Slurry for Inflow Cell Side Catalyst Layer | | | Particle Size of Solid Content of Slurry for Inflow Cell Side | Density of Inflow Cell Side | Density of Outflow Cell Side | Proportion | Pressure | Amount of |
|---|---|---|---|---|---|---|---|---|---|
| | Carrier | Promotor 1 | Promotor 2 | Mass Ratio (Carrier:Pro-motor 2) | Catalyst Layer [μm] | Catalyst Layer [g/L] | Catalyst Layer [g/L] | of Filled Portion [%] | Loss at PM Accumulation [kPa] | Processed NOx [ppm] |
| Comparative Example 2 | Alumina (Type 1) | Barium Sulfate | Ceria-Zirconia | 7:1 | 3 | 25 | 75 | 52 | 8.2 | 423 |
| Example 1 | Alumina (Type 1) | Barium Sulfate | Ceria-Zirconia | 4:1 | 6 | 15 | 75 | 33 | 6.5 | 453 |
| Example 2 | Alumina (Type 2) | Barium Sulfate | Ceria-Zirconia | 7:1 | 6 | 25 | 75 | 36 | 6.8 | 445 |
| Example 3 | Alumina-Zirconia | Barium Sulfate | Ceria-Zirconia | 7:1 | 6 | 25 | 75 | 27 | 5.6 | 452 |

While embodiments of the exhaust gas purification device of the present disclosure have been described in detail, the present disclosure is not limited to the above-described embodiments, but various kinds of changes of design are allowed within a range not departing from the spirits of the present disclosure described in the claims.

All publications, patents and patent applications cited in the present description are herein incorporated by reference as they are.

DESCRIPTION OF SYMBOLS

1 Exhaust gas purification device
10 Honeycomb substrate
10Sa Inflow side end surface of honeycomb substrate
10Sb Outflow side end surface of honeycomb substrate
11 Frame portion
12 Cell
12A Inflow cell
12Aa Inflow side end
12Ab Outflow side end
12B Outflow cell
12Ba Inflow side end
12Bb Outflow side end
14 Partition wall
14a Inflow side end of partition wall
14b Position apart from inflow side end of partition wall by distance of 10% or more of length of partition wall
14c Partition wall reference position
14d Outflow side end of partition wall
14e Position apart from outflow side end of partition wall toward inflow side
14X Inflow cell side catalyst region of partition wall
14Y Outflow cell side catalyst region of partition wall
14SA inflow cell side surface of partition wall
14NA Inflow cell side inner region of partition wall
14SB outflow cell side surface of partition wall
14NB Outflow cell side inner region of partition wall
16 Sealing portion
20 Inflow cell side catalyst layer
30 Outflow cell side catalyst layer

What is claimed is:

1. An exhaust gas purification device comprising:
a honeycomb substrate; and
an inflow cell side catalyst layer,
wherein the honeycomb substrate includes a porous partition wall defining a plurality of cells extending from an inflow side end surface to an outflow side end surface,
wherein the plurality of cells include an inflow cell and an outflow cell adjacent across the partition wall,
wherein the inflow cell has an open inflow side end and a sealed outflow side end,
wherein the outflow cell has a sealed inflow side end and an open outflow side end,
wherein the inflow cell side catalyst layer is disposed on an inflow cell side surface in an inflow cell side catalyst region extending from an inflow side end of the partition wall to a position apart by a distance of 10% or more of a length of the partition wall along an extending direction, and
wherein, when a proportion of a filled portion filled with the inflow cell side catalyst layer in pores of the partition wall which are present in an inner region up to a depth of 50% of a thickness of the partition wall from the inflow cell side surface of the partition wall at a reference position apart from the inflow side end of the partition wall by a distance of 10% of the length of the partition wall along the extending direction is a proportion of an area of a filled portion filled with the inflow cell side catalyst layer in pores of the partition wall present in the inner region of the partition wall relative to an area of the pores of the partition wall present in the inner region of the partition wall in a cross-sectional surface perpendicular to the extending direction at the reference position of the partition wall, the proportion of the filled portion is 40% or less.

2. The exhaust gas purification device according to claim 1,
wherein the inflow cell side catalyst region of the partition wall is a region extending from the inflow side end of the partition wall to a position apart by a distance of 10% or more and 60% or less of the length of the partition wall along the extending direction.

* * * * *